July 29, 1952 W. B. EWING 2,604,698
TILT CORRECTING DIRECTOR
Filed Sept. 5, 1945 9 Sheets-Sheet 1

July 29, 1952  W. B. EWING  2,604,698
TILT CORRECTING DIRECTOR

Filed Sept. 5, 1945  9 Sheets-Sheet 3

INVENTOR
WALKLEY B. EWING

BY
Ralph L. Chappell
ATTORNEY

July 29, 1952  W. B. EWING  2,604,698
TILT CORRECTING DIRECTOR
Filed Sept. 5, 1945  9 Sheets-Sheet 4

INVENTOR
WALKLEY B. EWING
BY
Ralph Chappell
ATTORNEY

July 29, 1952 W. B. EWING 2,604,698
TILT CORRECTING DIRECTOR
Filed Sept. 5, 1945 9 Sheets-Sheet 7

INVENTOR
WALKLEY B. EWING
BY
Ralph L. Chappell
ATTORNEY

July 29, 1952  W. B. EWING  2,604,698
TILT CORRECTING DIRECTOR
Filed Sept. 5, 1945  9 Sheets-Sheet 9

INVENTOR
WALKLEY B. EWING
BY
Ralph L. Chappell
ATTORNEY

Patented July 29, 1952

2,604,698

UNITED STATES PATENT OFFICE 2,604,698

TILT CORRECTING DIRECTOR

Walkley B. Ewing, Cambridge, Mass., assignor, by mesne assignments, to the United States of America as represented by the Secretary of the Navy Application September 5, 1945, Serial No. 614,563

15 Claims. (Cl. 33—46)

This invention relates to directors for aiming apparatus carried on mobile, floating, or swinging craft, and more particularly to directors adapted to correct the motion of the apparatus being aimed for the tilt of the platform or support upon which said apparatus is mounted under conditions where said tilt is subject to variations.

The invention finds particularly useful application for the aiming of guns, searchlights, and radio echo detection apparatus carried on board ship. The invention is herein fully illustrated in its application to the aiming of radio echo detection apparatus but it is to be understood that similar application can be made of this invention for the aiming of guns, searchlights and other apparatus.

For the aiming of apparatus carried aboard ship it is generally desired to refer the direction of aim to a position or axis which is independent of the pitch and roll of the ship. It is often impractical to provide stabilized platforms for this purpose, either because the apparatus which would have to be carried on such a platform is so heavy that much force would be required to stabilize it or because it is desired to place the apparatus to be aimed at such height that the apparatus is subject to very high moments of inertia. It is also desirable to correct not only for the tilt of the azimuth axis produced by the motion of the ship but also for the tilt of the elevation axis, although the obtaining of corrections for each of these separately and then applying such corrections as heretofore performed has involved such complicated arrangements as to cause many persons to prefer radio detection apparatus in which only the azimuth correction is made, in which a cross-level adjustment is provided to compensate for some of the elevation error.

An object of this invention is to provide a tilt-correcting director apparatus which simultaneously corrects both azimuth and elevation for the motion of the craft on which the apparatus is carried.

Another object of this invention is to provide a tilt-correcting director apparatus which is able to simultaneously correct azimuth, elevation and cross-level of the directed apparatus for the motion of the craft on which the apparatus is carried.

A further object of the invention is to provide a tilt-correcting director apparatus which enables the substantially accurate aiming of radio echo detection apparatus mounted on ship board on a two-axis mount.

Further objects and advantages of this invention, as well as its construction, arrangement, and operation, will be apparent from the following description and claims in connection with the accompanying drawings, in which:

In general, the tilt-correcting director of this invention is provided with a gimbal frame the joints of which are adapted to be driven by a suitable stabilizer device, such as the gyroscopic stabilizing units now in a common use in connection with a stabilization of ordnance mechanism, in order to maintain a constant truly vertical position or reference axis irrespective of the motion of the craft in question. On this stabilized gimbal frame is mounted an arrangement for producing the desired aiming motion as referred to the true vertical axis. The parts of the mechanism describing the desired true aiming motion with respect to the stabilized vertical axis are then coupled by means of suitably pivoted joints to a shaft having a desired fixed relation to the craft. Motions occurring at one or more of the pivoted joints and motions imposed upon the shaft having a fixed relation to the craft are then measured and employed for controlling the aiming of the apparatus to be directed.

It will thus be seen that the director of this invention is essentially a mechanism for combining a desired motion with respect to the true vertical axis with a motion of a craft upon which aiming apparatus is carried to produce a composite or resultant motion which may then be imposed upon the apparatus being aimed in such a manner that the direction obtained bears a relation to the true vertical and to the course of the craft prescribed by the original aiming motion applied to the stabilized portion of the director. The aim of the apparatus being directed may thus be made to follow a prescribed pattern with respect to the true vertical and to the ship's course.

Figures 1, 15:
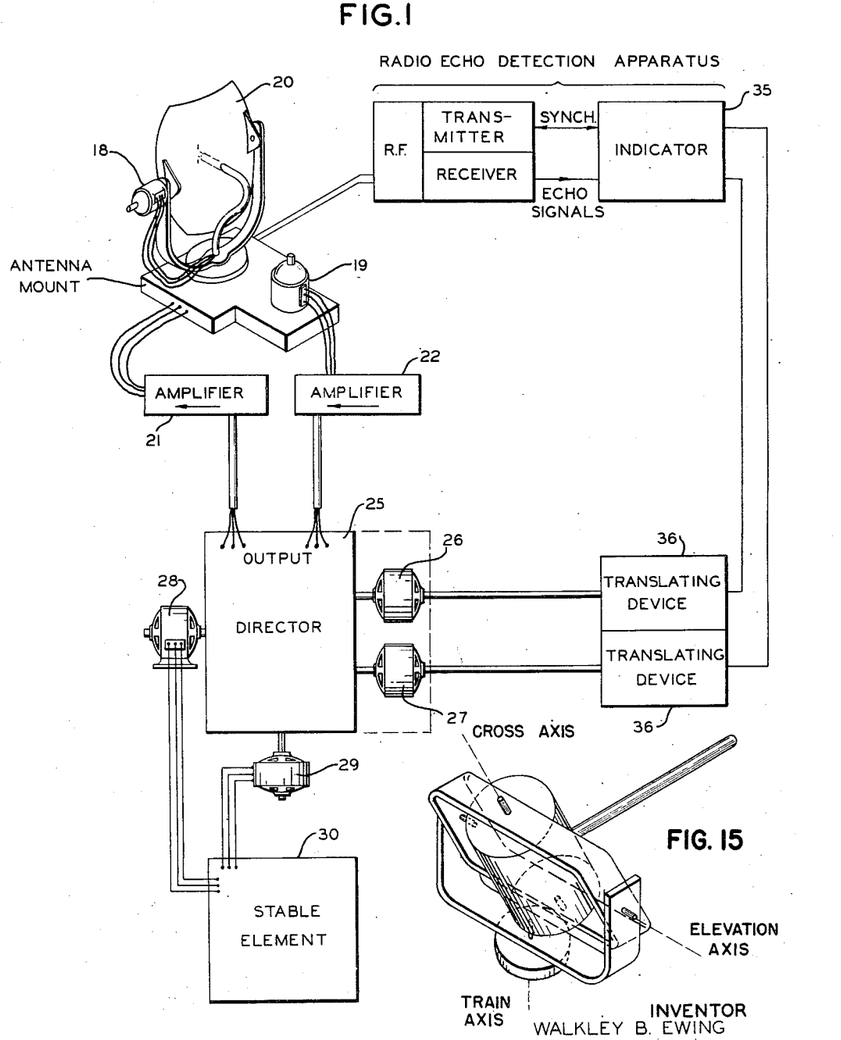
Fig. 1 shows, partly diagrammatically, a system for the application of the invention for the aiming of a two-axis device, in this case a radio echo rotating detecting device.
Fig. 15 is a simplified perspective diagram illustrating a form of three-axis mount for use in mounting relatively heavy members such as guns.

Referring to the drawings, the general organization of a system including a radio echo detection antenna 20 provided with stabilization in accordance with this invention is shown in Fig. 1, said antenna being driven by servo train drive 19, and servo elevation drive 18. Servo drive units 18 and 19 are operated from a pair of suitable servo amplifiers 21 and 22, which are in turn fed with the output of a director unit 25. Director unit 25 mechanically combines the motions produced by a pair of directing motors 26 and 27 with the motions of the vessel upon which the apparatus is mounted, the latter motions being provided through a pair of motors 28 and 29 from a stable element 30 which may be a gyroscopic device of known form.

In general the operation of motors 28 and 29 is such as to provide a stable vertical axis in director apparatus 25, while motors 26 and 27 are adapted to provide directing motions as computed relative to said stable vertical apparatus. Scanning motors 26 and 27 may also control sweeps of an indicator apparatus 35 through suitable translating devices indicated collectively at 36. In automatic tracking apparatus, motors 26 and 27 may be controlled by the receiver of a radio echo detection system. While a particular drive provided by motors 28 and 29 is described, if desired the drive provided by motors 28 and 29 may be by any direct mechanical linkages from stable element 30, or by any suitable type of servo system.

Antenna system 20 may be either a two-axis or three-axis system. In general a two-axis system will serve well for long range search service at low elevation angles, such as 45° or less, whereas a three-axis system is preferable for fire control service or wherever operation at both high and low angles of elevation is desired.

Figure 2:
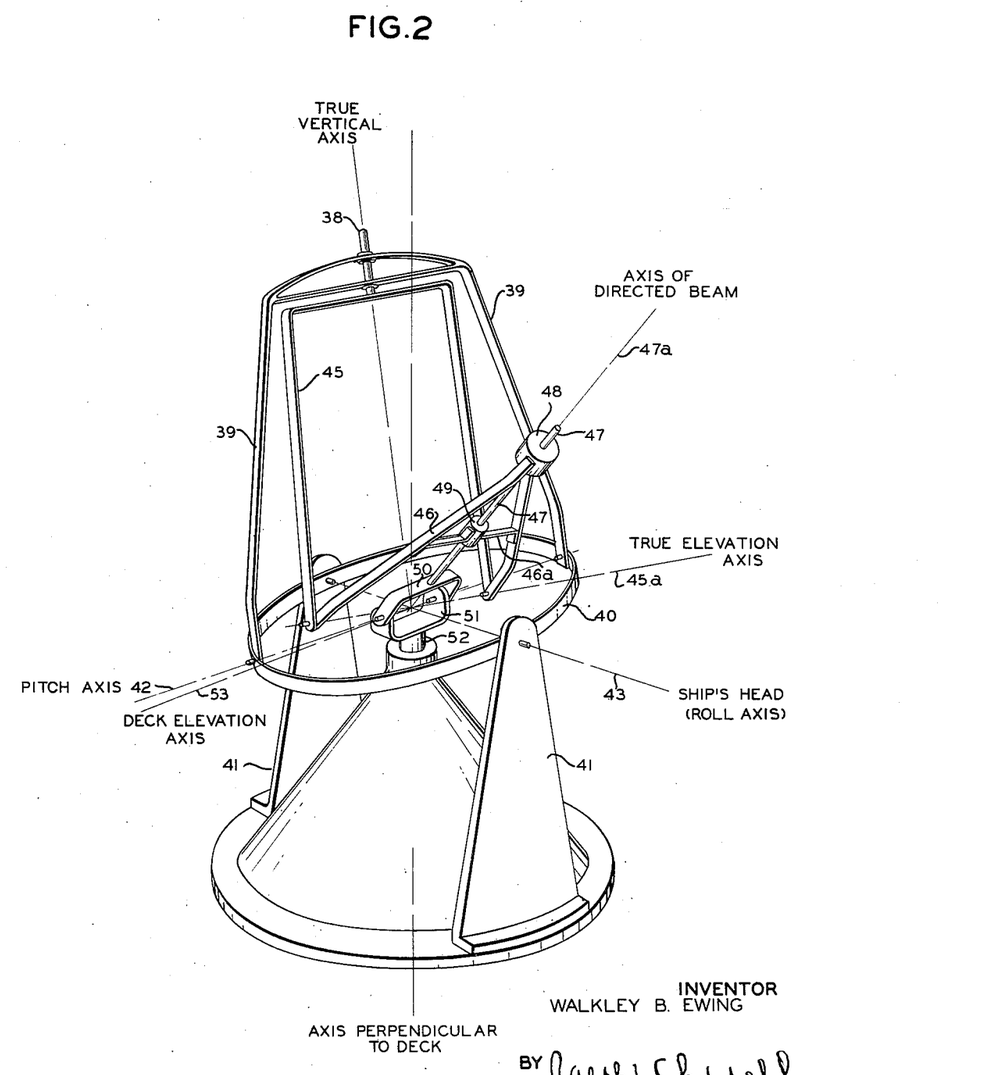
Fig. 2 is a simplified perspective diagram of a tilt-correcting director illustrating the principles of this invention as applied to the controlling of a two-axis aiming apparatus.

Fig. 2 illustrates the essential principles of this invention as applied to a director for a two-axis antenna system. In this figure the various motors and translating devices have been omitted in order to simplify the representation. A shaft 38 is rotatably mounted in an articulated frame 39, 40, on a pair of supports 41, the members 39, 40 and 41 being the equivalent of a system of gimbals. Driving forces are applied at the joints between the members 39 and 40 and between the members 40 and 41 by means of motors (not shown), these forces being adapted to keep the shaft 38 aligned on a true vertical axis irrespective of motions of the vessel on which the device is mounted. The forces adapted to keep the shaft 38 aligned in a true vertical position may be rotational forces about a pair of perpendicular axes 42 and 43, and if supports 41 are so mounted that the axis 43 is parallel to the longitudinal axis of the ship, the rotational force about the axis 42 will compensate for the pitch of the ship while the rotational force about the axis 43 will compensate for the roll of the ship. Such rotational forces may be provided by suitable gyroscopic devices of known form, such a device being generally shown in Fig. 1 as element 30. If it be found to be desirable, a single gyroscopic stable element may supply forces to a number of director devices of the type shown in Fig. 2.

The shaft 38 carries a fork 45 which is adapted to revolve in the space inside the articulated frame 39, 40. At the extremities of fork 45 are pivoted the ends of a yoke 46, 46a, which supports a shaft 47 by means of a pair of ball bearings 48 and 49. The axis of the pivot joints between the fork 45 and yoke 46, is perpendicular to the axis of the shaft 38. When the shaft 38 is driven by a suitable motor in accordance with the desired relative bearing (azimuth) and when the yoke 46 is driven by a motor about its pivot with respect to fork 45 in accordance with the desired true elevation the axis of shaft 47, herein termed the axis of directed beam or line of sight axis 47a, will correspond (i. e. be parallel to) to the desired line of sight, which is the direction in which it is desired to orient the directive antenna. By applying suitable forces, which may readily be generated by motors, to shaft 38 and to the pivots between yoke 46, 46a and fork 45, the shaft 47 may be made to describe the desired scanning or following motions.

Shaft 47 is freely journaled in ball bearings 48 and 49 and carries on its lower extremity a fork 50 which is connected by a pivot joint to another fork 51 mounted on a shaft 52 which is free to rotate only on an axis perpendicular to some reference plane associated with the ship, which plane may be referred to as the deck. All of the following axes about which motion is provided or permitted, to-wit: the pitch axis 42, roll axis 43, true relative bearing axis 38, true elevation axis 45a, line of sight axis 47a, the axis of the pivot joint between the forks 50 and 51, which is the deck elevation axis 53, and the axis perpendicular to the deck on which shaft 52 rotates, which may be referred to as the train axis intersect each other in a single central point. Thus, the system may be regarded as composed of two concentric universal joints, the outer universal joint being composed of the gimbal system 39, 40, 41 and the inner universal joint being composed of fork 45, fork 51 and intermediate members 46, 47, and 50. The inner system is actually more than a conventional universal joint and would be such a universal joint only if yoke 46 were locked in the position for zero degrees target elevation, which is that position in which axis 47a is maintained perpendicular to axis 38. It is the freedom provided by bearings 48 and 49, however, permitting axes 53 and 45a to approach each other, which gives the characteristic resolving or computing effect of the device. It has been shown that by forces applied about the axes 42, 43, 38 and 45a, the axis of shaft 47 is maintained parallel to the desired line of sight.

For a given position of shaft 47, the angular relations of forks 50 and 51 about axis 53 and the angular position of the fork 51 about the axis of the shaft 52 will be uniquely determined. The position of fork 51 with respect to the axis of shaft 52 will therefore give the desired train angle, while the relative position of forks 50 and 51 will give the desired deck elevation angle. These angles may be caused to generate electrical signals by means of well-known electrical translating devices and these signals may be amplified and provided to suitable servo systems adapted to cause the directive antenna to be directed accordingly in train and deck elevation. The directive antenna may be provided with a simple two-axis mount as in Fig. 1, firmly secured to the deck, mast, or some other fixed portion of the ship, and the servo systems associated with the two-axes of the mount may thus be driven to keep the directive antenna always oriented substantially in the desired line of sight, the direction of which is determined by the position of axis 47a. One advantage of this arrangement, particularly in comparison with arrangements previously used for directing gun batteries is that the gyroscopic stable element is not rotated in synchronism with the directive antenna. The gyroscopic stable element in this case may remain in fixed position relative to the ship and may supply stable vertical data to any number of antenna directors.

It is not necessary that the stable element the output of which maintains the shaft 38 in a true vertical position should provide outputs corresponding to the pitch and roll, so long as the stable element provides stabilizing outputs with reference to some suitable pair of axes. Thus, the stable element which maintains shaft 38 in a true vertical position need not be a special stable element which serves only the purpose of cooperating with director apparatus of the type of Fig. 1, and it may be a stable element associated with a gun battery so that the "level" and "cross level" axes to which the output of the stable element are referred may move about with the motion of the gun.

Figure 3:
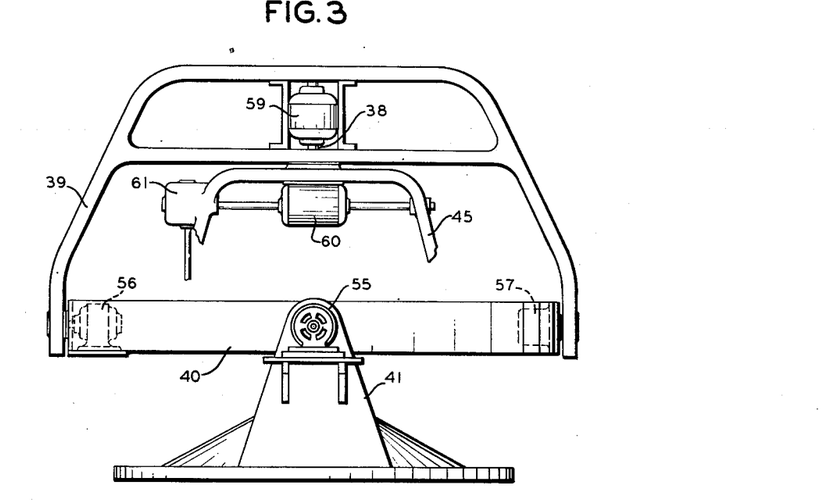
Fig. 3 illustrates, in elevation, the outer parts of a director constructed in accordance with the present invention showing the manner in which the various drive motors may be associated with the various mechanical linkages.
Figure 4:
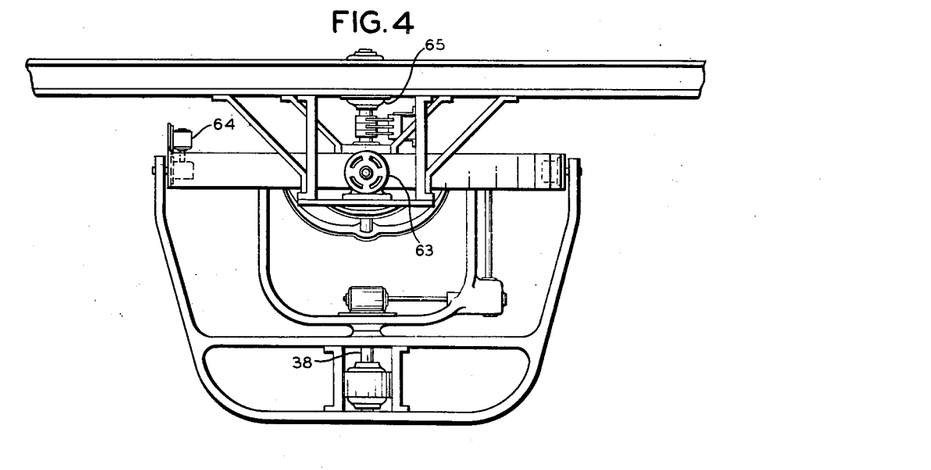
Fig. 4 illustrates, also in elevation, a form of the invention supported from above instead of below, disclosing the manner in which the various drive motors and a train angle take off device may be associated with the various mechanical linkages of this modification of the invention.
Figure 5:
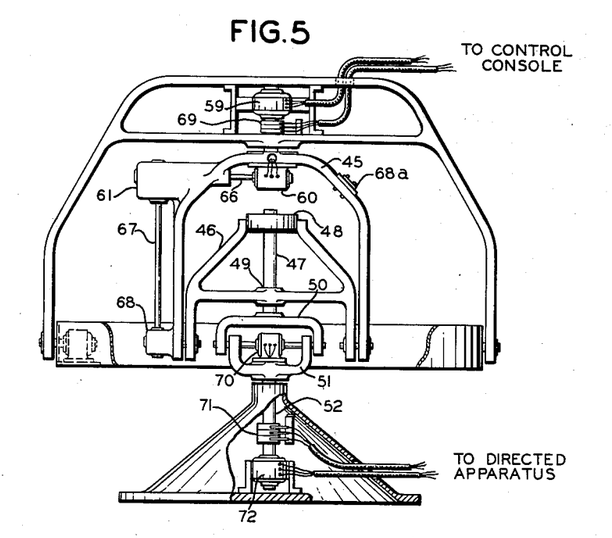
Fig. 5 illustrates the inner portion of the device of Fig. 3, the outer portion being broken away for purpose of illustration.

Figs. 3, 4, and 5 illustrate more completely the organization of director devices of this invention, showing different manners in which the various driving motors and take-off devices may be associated with the various mechanical linkages. Fig. 3 illustrates the outer parts of the apparatus, with the support 41 and the articulated gimbal frame elements 39 and 40 constituting, as before, the outer gimbal system. A motor 55 controls the angular position of frame 40, while a motor 56 controls the relative angular position of frames 39 and 40. Motors 55 and 56 may be driven from the output of a suitable stable element. A counter-weight 57 is provided to balance the weight of motor 56. Shaft 38 is driven by motor 59, while a motor 60, mounted on fork 45, is adapted to put the true elevation angle into the device, acting through a gear box 61. All motors are preferably of the servo type being controlled by an alternating current system of the self-synchronous type. In the case of motors 55 and 56, the remote control mechanism is the gyroscopic stabilizing mechanism, while in the case of motors 59 and 60 it is a control panel into elements of which are set the desired bearing and true elevation angles. More specifically motors 59 and 60 may be controlled by means of a control console well known in the art from which they receive signals corresponding to desired relative bearing and true elevation, respectively. The lower part of fork 45 and the rest of the inner portion of the apparatus have been broken away in Fig. 3 in order to make the illustration of the outer portion more simple.

It is not necessary that the director apparatus be supported from below as shown in Figs. 2 and 3, but instead may be supported from above as shown in Fig. 4. One advantage of the modification of Fig. 4 is that in this embodiment of the invention the weight of the apparatus tends to maintain the axis of shaft 38 in a vertical position instead of opposing to some extent the action of the stabilizing motors. The stabilizing motors which serve to maintain shaft 38 in a true vertical position are shown at 63 and 64 respectively. In this view there also appears a take-off device 65 which serves to provide train angle information to the servo drive of the corresponding axis in the directed equipment. Device 65 may be a servo transmitter of the "Selsyn" type, or even a pair of such devices, one of which is geared up with respect to the other so that the low-speed device will give an unambiguous signal adapted to check the more accurate signal of the faster device, in accordance with well known principles.

Shaft 38 is rotated in accordance with desired relative bearing signals (azimuth) received from a control console, while take-off device 65 operates in the plane of the deck, the signals therefrom being equal to the value of the relative target bearing plus or minus deck tilt correction.

Fig. 5 shows the inner portion of the device of Fig. 3, the outer portion having been broken away for purposes of illustration. As heretofore stated, motors 59 and 60 are of the servo type and may be operated in such manner that motor 59 receives signals corresponding to an azimuth component and motor 60 receives signals corresponding to an elevation component of an aiming device well known in the art. The complete drive system of motor 60 appears in this drawing, including a gear box 61, shafts 66 and 67 and a second gear box 68, through which the drive is applied to yoke 46. Electrical connections to motor 60 are made through slip-ring contacts shown at 69. A counter-weight 68a is provided to improve the dynamic balance of fork 45. No motors or take-off devices are associated with bearings 48 and 49 of shaft 47, but take-off device 70, mounted on fork 51, serves to provide signals corresponding to the deck elevation, which is the angle between forks 50 and 51. These signals are connected to a corresponding servo system through slip-rings 71, a servo elevation drive for receiving these signals being shown at 18 of Fig. 1. The rotational position of shaft 52 which is driven in the plane of the deck determines the signal produced in a take-off device 72, which corresponds to take-off device 65 of Fig. 4, and determines the desired train angle, which is transmitted to a servo motor of the device to be aimed as motor 19 of Fig. 1.

Figure 6:
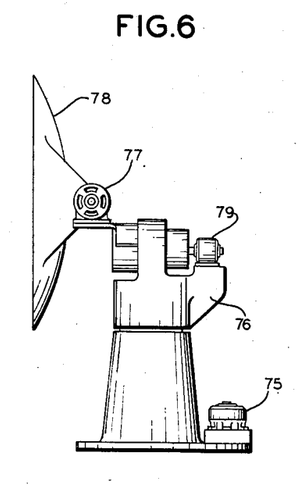
Fig. 6 is a side elevation of a three-axis aiming apparatus, in this case a radio echo location and detection apparatus.
Figure 7:
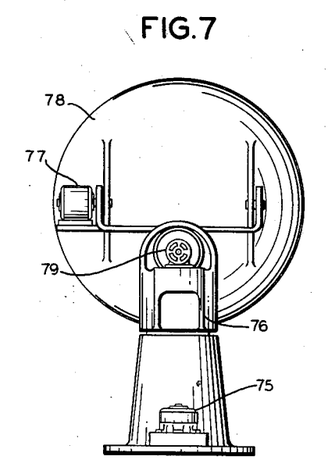
Fig. 7 is a rear elevation view of the apparatus shown in Fig. 6.

It is to be noted that shaft 38 is rotated in accordance with the desired relative bearing signals (azimuth) received from a control console, but that take-off device 72, associated with shaft 52, is driven in the deck plane and that the signals delivered by device 72 are therefore equal to the value of the relative target bearing plus or minus deck tilt correction.

Where operation at both high and low elevations is desirable, a three-axis antenna mount and a corresponding type of director should be used. Figs. 6 and 7 show one form of three-axis antenna mount. A servo motor 75 serves to drive the upper part of the mount, including a rotatable base 76, about the train or azimuth axis which is vertical in Figs. 6 and 7. A servo motor 77 serves to tilt the antenna mount, including a parabolic reflector 78, about an axis which may be referred to as the elevation axis. A servo motor 79 serves to rotate the antenna system, and with it the elevation axis, about an axis perpendicular to the train axis, and this axis may be referred to as the cross axis or cross-level axis. The elevation axis is so arranged that it is perpendicular to the cross axis, just as the cross axis is arranged to be perpendicular to the train axis.

Figure 8:
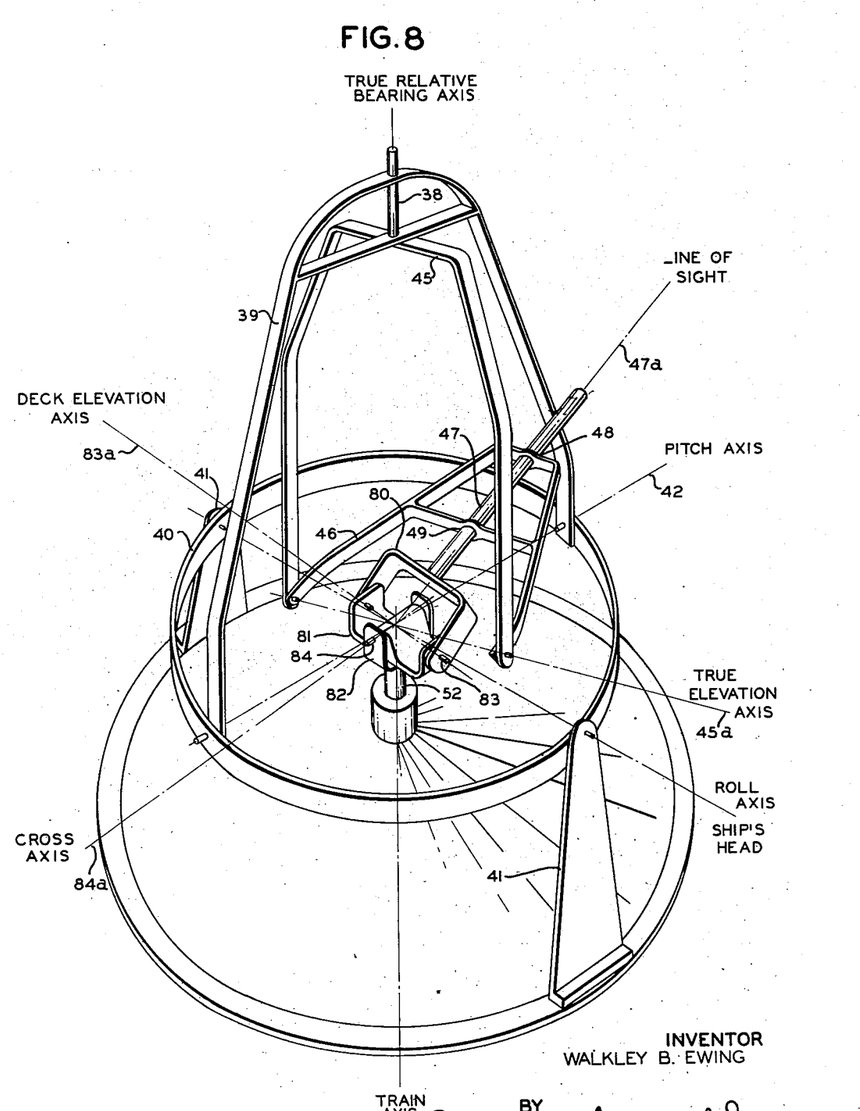
Fig. 8 is a simplified perspective diagram illustrating the construction of a director in accordance with this invention for directing a three-axis aiming apparatus.

Fig. 8 shows, in a similar manner to that employed in connection with Fig. 2, the organization of a director apparatus for directing a three-axis antenna of the type shown in Figs. 6 and 7. It will be seen that this apparatus is substantially the same as that of Fig. 2 except for the fact that, instead of the two forks 50 and 51 with a single pivot joint between them, there are provided three forks 80, 81 and 82 with two pivot joints, shown respectively at 83 and 84, corresponding respectively to the deck elevation axis 83a and to the cross axis 84a. Thus, in this case, there is a complete universal joint between the shaft 47 and shaft 52. Appropriate take-off devices commonly known as servo transmitters and which may be of the "Selsyn" type may be associated with pivots 83 and 84 and with shaft 52 to transmit level, cross-level, and azimuth signals to control transformers associated with the device to be aimed as disclosed and discussed in connection with Fig. 10.

Figure 9:
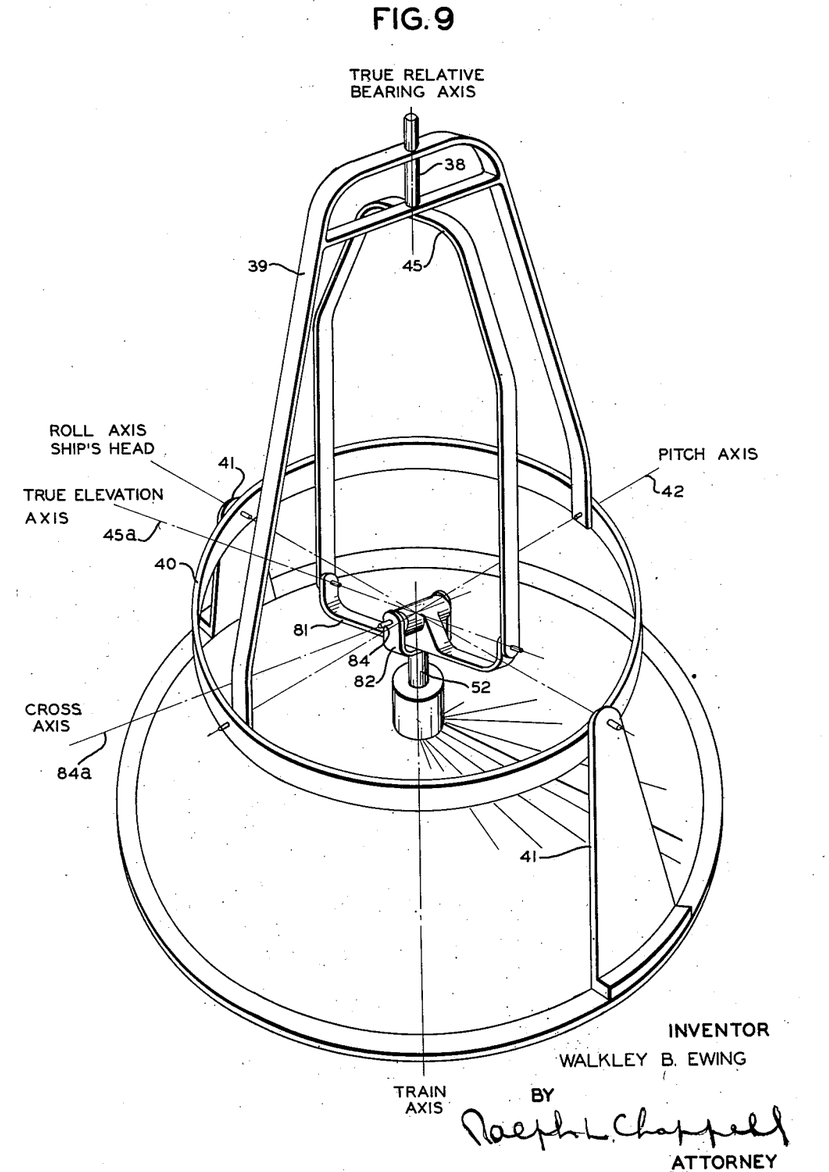
Fig. 9 is a perspective view of a more simple embodiment of the invention as disclosed in Fig. 8.

Fig. 9 illustrates a more simple form of the invention in which yoke 46, shaft 47, and fork 80 of Fig. 8 are omitted from the structure illustrated by Fig. 8. With the exception of the above omitted members Fig. 9 is similar to the embodiment shown in Fig. 8. As shown, forks 45 and 81 are pivotally joined, thereby forming a universal joint for connecting shafts 38 and 52. There is thus provided one shaft which is maintained in a fixed reference position independent of disturbing motions such as roll and pitch of the vessel, a second shaft which is in a fixed position with respect to the vessel but rotatable with respect thereto, and a universal joint including yokes 45, 81, and 82, for operatively connecting said shafts. Suitable drive and take-off devices may be associated with shaft 38, the pivot joints forming the universal joint, and shaft 52 as heretofore described to cause rotation of shaft 38 in response to a desired aiming motion and to transmit control signals in conformance with angular motion of the pivots of the universal joint and in conformance with rotary motion of shaft 52. These signals, as heretofore explained, are transmitted to suitable servos associated with the device to be aimed in order to control level, cross-level, and azimuth orientation of said device.

Figure 10:
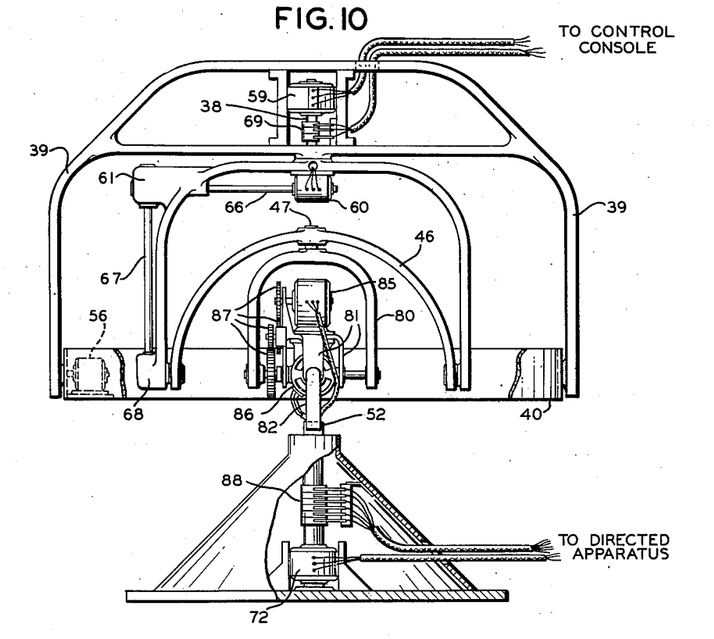
Fig. 10 shows, in elevation, the inner parts of a director constructed in accordance with this invention, including various drive motors and take-off devices for operating a three-axis aiming apparatus some of the outer parts being broken away for the purpose of illustration.

A form of construction corresponding to that of Fig. 8 embodying motor and take-off devices is shown in Fig. 10, the view in Fig. 10 corresponding generally to Fig. 5, the outer portions of the device being again broken away for purposes of illustration. Instead of the single take-off device 70 of Fig. 5, however, there are now two take-off devices, one associated with the deck elevation axis and shown at 85, and one associated with the cross axis as shown at 86. Take-off device 85 is coupled to the driving axis by means of gears shown at 87. Electrical connections from devices 85 and 86 are brought out through slip rings 88.

In a three-axis system as shown in Figs. 6 and 7, a given line-of-sight direction no longer corresponds unambiguously with particular settings of the respective axes of the mount, but a number of combinations of settings of the various axes are able to give the same line-of-sight. In the operation of a three-axis system it may be sought to control one axis of the mount so that the desired motion of the line-of-sight may be followed without slewing, by operation of the other two axes of the mount.

During ordinary low-elevation operations the cross axis 84a will not come very much into play because the angle between the cross axis and the line-of-sight will be fairly small and in consequence the mechanical linkage will accommodate itself more readily by rotation of the shaft 47 than by rotation about the cross axis 84a. This will be because shaft 47 is simply mounted on ball bearings 48 and 49, whereas rotation about axis 84a involves operation of take-off device 86 which may be expected to have greater frictional and other resistance than the ball bearings on which shaft 47 is mounted. This is to be desired since the operation of the device about shaft 47 rather than about one of the shafts associated with one of the take-off devices economizes driving movements in the antenna mount and thus furnishes stabilization of the antenna with a minimum of mechanical driving motions. It is to be noted in this connection that systems of the types in present use which employ the cross level axis of the antenna mount solely for the purpose of introducing stabilization motions are subject to the disadvantage during operation at low elevation, especially in forward and aft directions, that there is likely to be a considerable amount of unnecessary motion about the cross axis. The economy of motion provided by the control of three-axes in accordance with this invention is expected to lengthen the life of the antenna mount and associated equipment. As the line of sight diverges more and more from cross-axis 84a, motion begins to take place about the cross-axis in spite of the somewhat greater resistance to such motion about this axis compared with the resistance to motion about the axis of shaft 47. Finally, when the line-of-sight intersects the cross axis at a relatively large angle, such as 60° or more, the forces on the cross-axis imposed by rotation of the shaft 38 become relatively large during portions of the cycle of rotation of the shaft 38, the particular portion depending upon the instantaneous position of the plane of the deck. These are the forces which would ordinarily tend to cause slowing of the train axis and thus impose strain upon the director apparatus and set impractical requirements on the antenna mount. In this case, however, these forces are taken up by rotation about the cross axis and the residual forces applied to the train axis (shaft 52) do not involve such high velocities of rotation and are without difficulty applicable, with suitable amplification, to the antenna mount.

When the line-of-sight approaches very close to the true vertical, it becomes difficult, and impossible when it coincides with the true vertical, to transmit rotation to the shaft 52 from shaft 38 in the arrangement shown in Fig. 10. If it is attempted to follow a target crossing directly overhead on a non-linear course it is possible that after the target passes the zenith and the true azimuth and elevation axes are operated to follow it down again, the deck elevation and cross axes may be interchanged and the director and antenna mount will tend to operate with the position of these axes thus interchanged. Care must be taken to insure that the train axis will be so oriented when the target moves away from the zenith that the line-of-sight axis of the director will follow the target down by movement about the deck elevation axis rather than about the cross-axis.

One way to provide this assurance is to lock shaft 47 in a predetermined position so as to prevent rotation thereof in its bearings when high elevations are approached. The train axis is the only axis of the antenna mount about which a complete revolution can be performed and for this reason it is desirable to maintain an effective connection between the driving axes (the relative bearing and true elevation axes) and train axis 52 in order to take measures to prevent undesired interchanging of the other two axes of the antenna mount. The desired locking of shaft 47 should be such as to bring the deck elevation axis 83a into coincidence with the true elevation axis 45a. One way of providing such locking is shown in Fig. 11.

Figure 11:
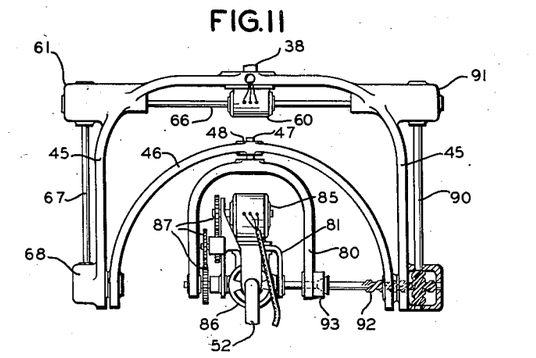
Fig. 11 shows a modification of the inner portions of Fig. 10 illustrating means for locking the deck elevation and true elevation axes into coincidence when relatively high elevations are approached.

Fig. 11 is an enlarged view of a modification of the inner portions of Fig. 10. According to this embodiment of the invention, shaft 66, driven by true elevation motor 60 extends on both sides of the motor 60, the right-hand portion driving an additional shaft 90 by means of a gear box 91. Shaft 90 is adapted to propel or retract longitudinally a shaft 92, which may be driven by a system of helical gears or the like. The end of retractable shaft 92 is provided with a conical surface adapted to engage in a conical hollow of a structure 93 provided on one of the arms of fork 80. For low angles of elevation of the line-of-sight, which is to say when yoke 46 is depressed at large angles with respect to fork 45, shaft 92 will be in a retracted position so that there will be no restraint to rotation of shaft 47 in its bearing 48. As the elevation of the line-of-sight increases with corresponding motion of yoke 46, as imposed by motor 60, shaft 92 will advance towards fork 80. When the true elevation exceeds a predetermined angle, such as, for instance, 45° or 60°, shaft 92 will insert its conical extremity into the conical hollow of structure 93.

In the automatic locking system shown in Fig. 11 the locking action takes place somewhat gradually. At low elevations, where the motions of the ship are likely to result in considerable motion of shaft 47 in its bearings there is no locking action at all. At the elevation where the locking action is just beginning, shaft 92 acts as a stop to prevent motion of shaft 47 in its bearing beyond certain angular limits. As the elevation becomes higher, these limits are made narrower and narrower until eventually shaft 47 is locked fast so that the driving forces generated by motor 59 (see Fig. 10) are applied to fork 80 almost entirely through the engagement of shaft 92 with the structure 93. Most radio echo detection systems are likely to be operated most of the time at elevations below 12°. The lock-in could advantageously operate at elevations of 35° or thereabouts and on large vessels, which roll even less, about 20°. With this type of operation of the lock-in device there is practically no chance of the line-of-sight coinciding with either the true relative bearing axis or the train axis when the lock-in device is not in locked position.

Figure 12:
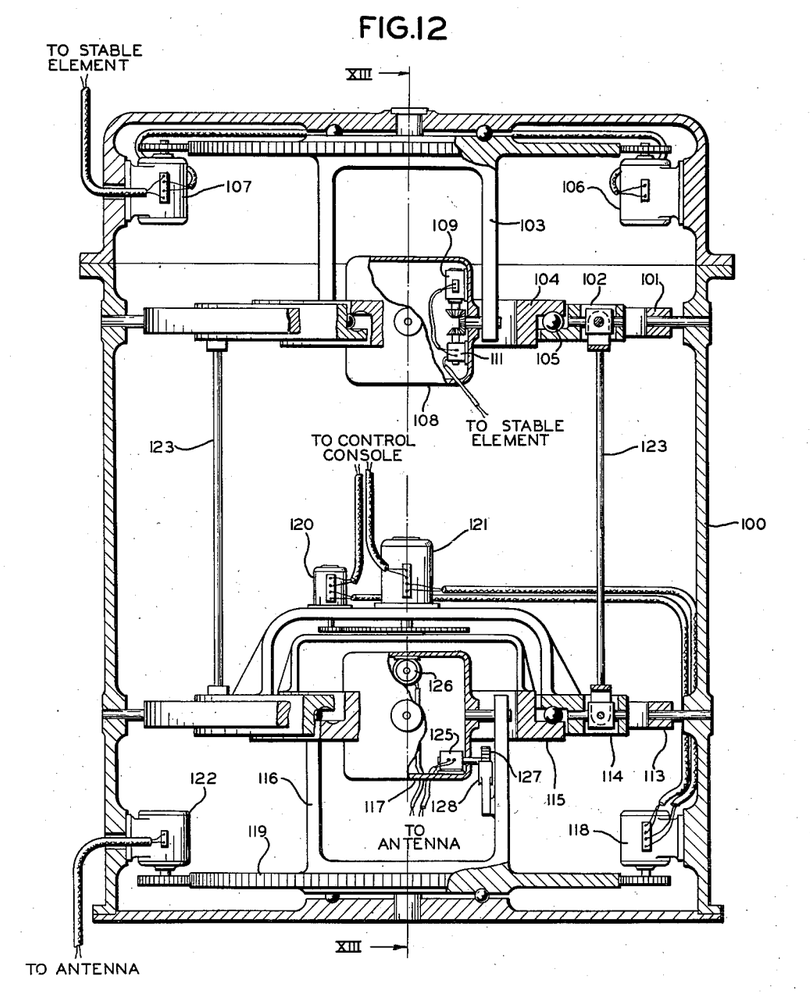
Fig. 12 illustrates diagrammatically, partly in section, the structure of a modified director constructed in accordance with the principles of this invention, including various drive motors and take-off devices for controlling an apparatus to be aimed, the outer casing being sectioned for purposes of illustration.
Figure 13:
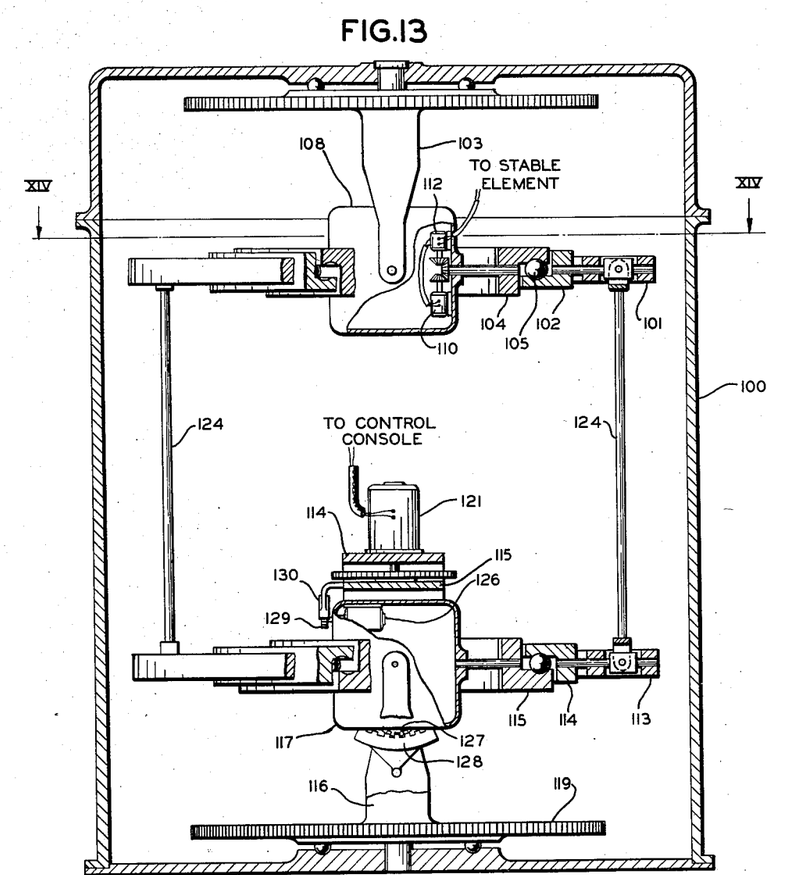
Fig. 13 is a diagrammatic elevation of the modified director of Fig. 12 in which the outer casing has been sectioned along the line XIII—XIII of Fig. 12.
Figure 14:
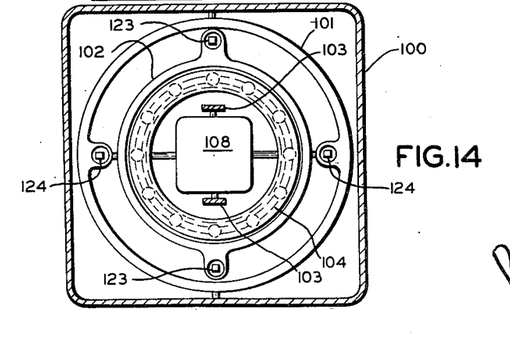
Fig. 14 is a diagrammatic illustration taken along the line XIV—XIV of Fig. 13 showing the orientation of axes about which the various members of the gimbal systems are caused to pivot.

Figs. 12 and 13 show a modification embodying the principles of this invention which includes an outer casing 100 having two concentric gimbal systems positioned in the upper portion thereof in which all gimbal axes are parallel to the ships' deck reference plane when the pitch and roll values are equal to zero. One of these gimbal systems comprises a roll member in the form of a ring 101, and a pitch member in the form of a ring 102. These members are constructed with their axes parallel to the roll and pitch axes of the ship.

The second gimbal system mounted in the upper portion of casing 100 includes a yoke 103 and a level member in the form of a ring 104, the latter ring being mounted on, and rotatable with respect to, pitch ring 102 by means of a ball race 105. Yoke 103 of this second gimbal system is carried by casing 100, being rotatably mounted thereon and being driven about this mounting by means of a motor 106 which receives signals from a train angle servo transmitter of the gyroscopic stabilizing element through a control transformer 107. In this manner, yoke 103 is maintained in an orientation parallel to train angle position of the cross-level support yoke element of the gyroscopic stabilizing device. Carried by members 103 and 104 is a housing 108 constituting a cross-level member which is pivotally mounted on said members, the pivots being disposed at right angles to each other. Positioned within housing 108 are two motors 109 and 110 together with control transformer synchros 111 and 112, respectively, therefor. Motor 109 is adapted to rotate housing 108 about the pivots associated with the yoke 103, while motor 110 is adapted to rotate level ring 104 about the pivots associated with housing 108. These motors and servo controls therefore are connected to servo transmitters in the gyroscopic stabilizing element and are actuated in response to signals received from the last-mentioned servo transmitters which transmit level and cross level signals as determined by pitch and roll of the vessel. In this manner level ring 104 is maintained in a horizontal position irrespective of disturbing motions of the vessel. It will be readily understood that level ring 102 which carries level ring 104 by means of ball race 105 will be maintained in a horizontal position at all times, this result being obtained through action of level member 104 acting through ball race 105.

In the lower portion of casing 100 there is positioned a second pair of concentric gimbal systems, the outer system being composed of a roll member in the form of a ring 113 and a pitch ring 114 having their axes disposed parallel to the roll and pitch axes of rings 101 and 102 respectively. Arranged within pitch member 114 is a second gimbal system including a level ring 115 and a cross-level support yoke 116 having a housing 117 pivotally mounted with respect to said ring and said yoke, the pivots being disposed at right angles with respect to each other. Cross-level support yoke 116 is carried by casing 100, said yoke being rotatably mounted thereon and rotatable with respect thereto, being driven about said rotatable mount by means of a suitable servomotor 118 driving through a suitable gear train 119. Servomotor 118 is controlled by a pair of control transformers 120 and 121 supported on ring 114 and rotatable by ring 115 which operate in response to relative bearing signals received from servo transmitters associated with a radio-echo detection control console. A take-off servo transmitter 122 is associated with gear 119 to transmit train order data to a corresponding train order servo associated with the antenna being stabilized. Mechanically connecting pitch rings 102 and 114 is a pair of connecting rods 123, while connecting roll members 101 and 113 there is provided a second pair of connecting rods 124, said rods being positioned at 90 degrees with respect to rods 123. All rods are of equal length, the length of which should be the same length, pin axis to pin axis, as the distance, center to center, between the gimbal systems. As heretofore explained, level ring 104 maintains pitch ring 102 in a horizontal position at all times independent of disturbing motions of the vessel. It will be readily understood that pitch member 114 and level member 115 will likewise be maintained in a horizontal position at all times.

Mounted within housing 117 are cross-level and level servo transmitters 125 and 126, respectively, transmitter 125 being mechanically connected to cross-level support member 116 by a gear and sector 127 and 128 and oriented in such manner as to transmit signals to a servo receiver associated with the cross-level member of the antenna being stabilized. Level servo transmitter 126 is mechanically connected to level member 115 by means of a gear and sector 129 and 130 said servo transmitter being oriented in housing 117 in such manner as to transmit signals to a second servo receiver associated with the level member of the antenna being stabilized.

In operation, motor 106 rotates cross-level support yoke 103 about its mounting in accordance with signals received from a train angle servo transmitter associated with a gyroscopic stabilizing mechanism, thereby maintaining cross-level support member 103 in an orientation parallel to the train angle position of the cross-level element of the gyroscopic stabilization device. Housing 108 is rotated with respect to yoke 103 by action of motor 109, while level ring 104 is rotated with respect to housing 108 through action of motor 110, motors 109 and 110 being controlled by level and cross-level servo transmitters in the gyroscopic stabilizing element which are actuated in response to roll and pitch of the vessel. In this manner, level member 104 is maintained in a horizontal position at all times independent of roll and pitch motions of the vessel. As heretofore explained, level member 102 is likewise maintained in a horizontal position at all times, horizontal ring 104 being in physical contact therewith through ball race 105. Level ring 114 together with level ring 115 which is in physical contact with ring 114 by a ball race similar to race 105, are maintained in a horizontal position at all times, ring 114 being connected to ring 102 by rods 123, while rings 101 and 113 are connected by rods 124. Rods 123 and 124 are provided with universal joints at the ends thereof. Yoke member 116 which is rotatably mounted in the plane of the deck of the vessel is rotated about its mount by action of servomotor 118 which is controlled by control transformers 120 and 121 which receive relative bearing signals from a radio echo detection control console. It will be readily understood, therefore, that servomotor 118 drives yoke member 116 in the deck plane in response to signals received by relative bearing servo receivers operating in the stabilized plane. Members 114 and 115 therefore rotate with respect to each other by the value of the relative target bearing angle, whereas yoke 116 rotates with respect to casing 100 by an amount equal to the aforementioned value plus or minus deck tilt correction. As heretofore stated servo transmitter 125 is operative to develop cross-level signals, these signals being transmitted to a corresponding servo receiver associated with the cross-level axis of the apparatus being aimed. In like manner servo transmitter 126 is operative to transmit level angle signals to a servo receiver associated with the level axis of the apparatus being aimed. Servo transmitter 122 transmits train angle signals in accordance with rotation of yoke member 116 as determined by operation of servomotor 118, these impulses being transmitted to a servo mechanism associated with the train axis of the apparatus being aimed.

Fig. 15 is a simplified perspective view representing the arrangement of the axes of a three-axis gun mount. In Fig. 6 the elevation axis is rotated by motion about the cross axis, while in the arrangement of axes shown in Fig. 15 the converse is true, the cross axis being rotated by motion about the elevation axis. In Fig. 6, only the unlikely event of ninety degrees rotation of the elevation axis from the horizontal position by rotation about the cross axis will bring two axes of the system into parallel relation, this event being usually outside the range of operation of the device. In the arrangement of Fig. 15, however, at zero elevation the cross axis and train axis are aligned. Practical considerations affecting the mounting of relatively heavy structures such as large guns render the arrangement of axes as shown in Fig. 15 preferable for mounting such structures.

Directing apparatus according to this invention may be provided for the stabilization of the three-axis system shown in Fig. 15 as well as the type of three-axis system shown in Fig. 6. Such a director would correspond to that of Fig. 8 in which shaft 47 is normally rotated in its bearings through an angle of ninety degrees from the orientation illustrated in Fig. 8. Yoke 82 would in this embodiment of the invention be of sufficient depth to allow yoke 81 to rotate about pivot 84 and pass through yoke 82. The automatic lock-in principle disclosed in connection with Fig. 11 is equally useful in a director for an axis arrangement as shown in Fig. 15, although in the application of this principle, the difference in arrangement of cross axis and deck elevation axes from that of Fig. 8 are to be kept in mind. In fact, in a director for an axis arrangement as shown in Fig. 15, two automatic locking arrangements would be desirable. Means for locking shaft 47 in a position adapted to bring the true elevation and deck elevation axes into alignment, without, however, interfering with the movement of the cross axis, could be provided as disclosed and discussed in connection with Fig. 11. In addition, similar means can be provided for automatically locking the cross axis at low elevation to assure that movement in azimuth will be performed chiefly about the train axis.

While several embodiments of the invention have been disclosed and described, it is to be understood that other modifications and changes may be made in this invention without departing from the spirit and scope thereof as set forth in the appended claims.

I claim:

1. A director for aiming-apparatus carried on mobile or floating craft which includes a pair of gimbal systems, a stabilizing element operatively connected to one of said systems for maintaining a member thereof in a reference position substantially independent of angular motion of said craft, means associated with said member for maintaining a member of the second of said systems in said reference position, a second pair of gimbal systems, means for maintaining a member of one of said second-mentioned gimbal systems parallel to said reference position, means for maintaining a member of the other of said second-mentioned pair of gimbal systems parallel to said reference position, and means associated with said last-mentioned gimbal system for transmitting signals as determined by roll and pitch of said craft and for transmitting target bearing signals including deck tilt correction to driving means associated with roll, pitch, and train axes of the apparatus to be aimed.

2. A director for aiming-apparatus carried on mobile craft which includes a rotatable shaft, a gimbal system for supporting said shaft, a stabilizing mechanism, means responsive to said mechanism for stabilizing said shaft in a vertical position substantially independent of angular motion of said craft, said gimbal system having a set of pivots aligned in the direction in which said craft is most readily adapted to move, means for rotating said shaft with an azimuth component of a desired aiming motion, a yoke fixed on said shaft and adapted to turn within said gimbal system, an inner yoke having its arms pivoted on the arms of said first-mentioned yoke, means associated with the pivot joint between said yokes for maintaining said yokes in a relative angular position corresponding to a desired elevation component of said aiming motion, a shaft rotatable with respect to said inner yoke carried on said inner yoke and oriented substantially perpendicular to said pivot joint, a first fork mounted on said last-named shaft, a third shaft in a fixed relation with said craft but rotatable relative thereto, a second fork mounted on said third shaft, a universal joint cross member pivotally connecting said forks, means associated with said cross member for controlling the elevation of the apparatus to be aimed in conformance with the angular motion at said cross member, and means associated with said third shaft for controlling the azimuth motion of the apparatus to be aimed in conformance with the rotation of said third shaft.

3. A director for aiming-apparatus on mobile or floating craft which includes a rotatable shaft, a gimbal system for supporting said shaft, a stabilizing mechanism, means responsive to said mechanism for stabilizing said shaft in a vertical reference position substantially independent of angular motion of said craft, means for rotating said shaft with an azimuth component of a desired aiming motion, a yoke fixed on said shaft and adapted to turn within said gimbal system, an inner yoke having its arms pivoted on the arms of said first-mentioned yoke, means associated with the pivot joint between said yokes to maintain said yokes in a relative angular position corresponding to a desired elevation component of said aiming motion, a second shaft rotatable with respect to said inner yoke carried on said inner yoke and oriented substantially perpendicular to said pivot joint, a third shaft in fixed relation but rotatable relative to said craft, a universal joint connecting said second and third shafts, locking means associated with said universal joint for locking said second-mentioned shaft and preventing rotation thereof with respect to said inner yoke in response to a predetermined degree of elevation of said shaft, means associated with said last-mentioned universal joint for controlling the elevation of the apparatus to be aimed in conformance with the angular motion of said joint, and means associated with said third shaft for controlling the azimuth motion of the apparatus to be aimed in conformance with the rotation of said third shaft.

4. A director for aiming-apparatus carried on mobile or floating craft which includes a rotatable shaft, a gimbal system for supporting said shaft, a stabilizing mechanism, means responsive to said mechanism for stabilizing said shaft in a vertical position irrespective of angular motion of said craft, means for rotating said shaft in conformance with the azimuth component of a desired aiming motion referred to the true vertical, a yoke fixed on said shaft and adapted to turn within said gimbal system, an inner yoke having its arms pivoted on the arms of said first-mentioned yoke, means associated with the pivot joints between said yokes adapted to produce relative motion of said yokes corresponding to the elevation component of said desired aiming motion, a shaft rotatable with respect to said inner yoke carried on said inner yoke and oriented substantially perpendiuclar to said pivot joint, a third shaft, a first fork mounted on said second-named shaft, a second fork mounted on said third shaft, and a cross member pivotally connecting said forks, said third shaft being in fixed relation with said craft but rotatable relative thereto, means associated with said cross member for providing the corrected elevation to the apparatus to be aimed in response to angular motion occurring at said cross member, means associated with said third shaft for providing the corrected azimuth to the apparatus to be aimed in response to rotation of said third shaft.

5. A director for aiming-apparatus carried on mobile or floating craft which includes a rotatable shaft, a gimbal system for supporting said shaft, a stabilizing mechanism, means responsive to said mechanism for stabilizing said shaft in a reference position substantially independent of angular motion of said craft about axes other than parallel to that of said shaft, means for rotating said shaft with an azimuth component of a desired aiming motion relative to the direction of said shaft as an axis, a yoke fixed on said shaft and adapted to turn within said gimbal system, an inner yoke having its arms pivoted on the arms of said first-mentioned yoke, means associated with the pivot joint between said yokes to produce relative motion of said yokes corresponding to an elevation component of said desired aiming motion, a second shaft rotatable with respect to said inner yoke and oriented substantially perpendicular to said pivot joint, a first fork mounted on said last-named shaft and a third shaft in fixed relation to said craft but rotatable relative thereto, a second fork mounted on said third shaft, and a universal joint cross member pivotally connecting said forks, means associated with said cross member for controlling the motion of the apparatus to be aimed about two axes corresponding in orientation to the axes of said cross member in conformance with the angular motion of said forks, and means associated with said third shaft for controlling the motion of the apparatus to be aimed about a third axis in conformance with rotation of said third shaft.

6. A director for providing azimuth, elevation, and cross level information to aiming-apparatus carried on mobile or floating craft comprising a rotatable shaft, a gimbal system for supporting said shaft, a stabilizing mechanism, means responsive to said mechanism for stabilizing said shaft in a vertical position independent of angular motion of said craft, means for rotating said shaft with an azimuth component of a desired aiming motion, a yoke fixed on said shaft, an inner yoke having its arms pivoted on the arms of said first-mentioned yoke, means associated with the pivot joint connecting said yokes for maintaining said yokes in a relative angular position corresponding to a desired elevation component of said aiming motion, a shaft rotatably mounted on said inner yoke and oriented perpendicular to said pivot joint, a third shaft in fixed relation but rotatable relative to said craft, a universal joint connecting said second and third-mentioned shafts, locking means associated with said universal joint automatically operative in response to a predetermined degree of elevation of said second-mentioned shaft for preventing rotation of said shaft with respect to said inner yoke, means associated with the pivots of said universal joint for controlling the cross-level and elevation, respectively, of the apparatus to be aimed in conformance with angular motion of said pivots, and means associated with said third shaft for controlling the azimuth of the apparatus to be aimed in accordance with rotation of said third shaft.

7. A director for providing azimuth, elevation, and cross level data to aiming-apparatus carried on mobile or floating craft comprising a rotatable shaft, a gimbal system for supporting said shaft, a stabilizing mechanism, means responsive to said mechanism for stabilizing said shaft in a vertical axis substantially independent of angular motion of said craft, means for rotating said shaft with an azimuth component of a desired aiming motion, a yoke fixed on said shaft, an inner yoke pivoted to said first-mentioned yoke, means associated with the pivot joint between said yokes to produce relative motion between said yokes corresponding to an elevation component of said desired aiming motion, a shaft mounted on said inner yoke and rotatable with respect thereto, a third shaft mounted on the deck in fixed relation with said craft but rotatable with respect thereto, a flexible connection between said shafts, means associated with said connection for locking the deck elevation axis into coincidence with the true elevation axis in response to a predetermined degree of elevation of said second-mentioned shaft, means associated with said flexible connection for controlling motion of the apparatus to be aimed about two axes corresponding in orientation to the axes of pivots of said flexible connection in conformance with angular motion of said pivots, and means associated with said third shaft for controlling motion of the apparatus to be aimed about a third axis in conformance with rotation of said third shaft.

8. In apparatus for the direction of a radio echo detection antenna in a prescribed scanning search pattern from a mount on the deck of mobile or floating craft, a director for correcting said scanning pattern for motion of said craft comprising, a rotatable shaft, a gimbal system for supporting said shaft, a stabilizing mechanism, means responsive to said mechanism for stabilizing said shaft in a reference vertical axis substantially independent of angular motion of said craft, means for rotating said shaft with an azimuth component of said scanning pattern referred to said vertical axis, a yoke fixed on said shaft and adapted to turn within said gimbal system, an inner yoke having its arms pivoted on the arms of said first-mentioned yoke, means operative at the pivot joint between said yokes to produce relative motion of said yokes corresponding to the elevation component of said scanning pattern referred to said vertical axis, a second shaft rotatable with respect to said inner yoke carried on said inner yoke and oriented substantially perpendicular to said pivot joint, a third shaft, a first fork mounted on said second shaft, a second fork mounted on said third shaft, a universal pivot joint between said first-mentioned fork and said second fork, said third shaft being in fixed relation to said craft but rotatable relative thereto, means associated with said last-mentioned pivot joint for providing a corrected elevation component of said scanning pattern to said antenna in response to angular motion occurring at said joint, and means associated with said third shaft for providing a corrected azimuth component of said scanning pattern to said antenna in response to rotation of said third shaft whereby the scanning motion of said antenna follows said prescribed scanning pattern substantially independently of the motion of said craft.

9. In automatic target tracking apparatus controlled from the output signals of the receiver of a radio pulse-echo detection system, a director for controlling the motion of a radio echo detection antenna carried on the deck of a mobile or floating craft comprising, a rotatable shaft, a gimbal system for supporting said shaft, a stabilizing mechanism, means responsive to said mechanism for stabilizing said shaft in a vertical reference position substantially independent of angular motion of said craft, means responsive to said output signals of said receiver for developing azimuth and elevation data concerning the position of a selected target, means for rotating said shaft in response to said azimuth data referred to said vertical axis, a yoke fixed on said shaft and adapted to turn within said gimbal system, an inner yoke having its arms pivoted on the arms of said first-mentioned yoke, means operative at the pivot joint between said yokes to produce relative motion of said yokes in response to said elevation data referred to said vertical axis, a second shaft rotatable with respect to said inner yoke carried on said inner yoke and oriented substantially perpendicular to said pivot joint, a third shaft, a first fork mounted on said second shaft, a second fork mounted on said third shaft, and a universal joint cross member pivotally connecting said first and second forks, said third shaft being in fixed relation to said craft but rotatable relative thereto, means operated with said cross member for driving said antenna in elevation, and means operated in response to rotation of said third shaft to drive said antenna in azimuth whereby said antenna position is controlled to follow the line of sight from said craft to the selected target in response to radio pulse-echo detection signals substantially independently of the motion of said craft.

10. A director for aiming apparatus carried on mobile or floating craft which includes a rotatable shaft, a gimbal system for supporting said shaft, a stabilizing mechanism, means responsive to said mechanism for stabilizing said shaft in a vertical axis substantially independent of angular motion of said craft, means for rotating said shaft with one rotation component of a desired aiming motion, a yoke fastened on said shaft and adapted to turn within said gimbal system, an inner yoke having its arms pivoted on the arms of said first-mentioned yoke, means associated with the pivot joint between said yokes to produce relative motion of said yokes corresponding to another rotation component of said desired aiming motion, a second shaft rotatable with respect to said inner yoke carried on said inner yoke, a first fork mounted on said second shaft, a third shaft in fixed relation with said craft but rotatable relative thereto, a second fork mounted on said third shaft, a universal joint cross member pivotally connecting the ends of said forks to couple said second shaft to said third shaft, means associated with said cross member for controlling the motion of the apparatus to be aimed about one axis in conformance with said angular motion at said cross member and means associated with said third shaft for controlling the motion of the apparatus to be aimed about an axis in conformance with the rotation of said third shaft.

11. A director for controlling the motion of aiming apparatus carried on mobile or floating craft for motion of said craft comprising, a stabilized vertical reference shaft, a member for defining a directed line of sight, means supporting said member for rotation about said shaft, means for positioning said member in a desired direction of aim referred to said shaft, a second shaft supported for rotation about an axis having a fixed relation to said craft, fork terminations for said member and said second shaft, and a pivoted universal joint connection journaled in the ends of said forks to couple said member to said second shaft.

12. A director for correcting the motion of aiming apparatus carried on mobile or floating craft for motion of said craft comprising, a stabilizing mechanism for establishing a stabilized vertical reference axis, a member for defining a directed line of sight, means supporting said member for rotation about said axis, means to position said member in a desired direction of aim referred to said axis, a shaft supported to rotate about an axis having a fixed relation to said craft, fork terminations for said member and said shaft, a pivoted universal joint connection journaled in the ends of said forks to couple said member to said shaft, and means responsive to the motion of said shaft and said pivoted universal joint connection to drive said apparatus to said desired direction of aim with reference to said craft.

13. A director for correcting the motion of aiming apparatus carried on mobile or floating craft for motion of said craft comprising, a rotatable shaft, a stabilizing mechanism, means responsive to said mechanism for supporting said shaft in a stabilized reference vertical axis, a member for defining a directing line of sight, means for supporting said member for rotation with said shaft, means to position said member in response to a desired aiming direction referred to said axis, a second shaft supported to rotate about an axis having a fixed relation to said craft, fork terminations for said second shaft and said member, a pivoted universal joint connection journaled in the ends of said forks to couple said member to said second shaft, and means responsive to the motion of said second shaft and said universal joint connection to drive said apparatus in said aiming direction with reference to said craft.

14. Apparatus for combining a prescribed pattern of motion in reference to a stabilizing axis with motion about a second axis to produce a resultant pattern of motion to follow the prescribed pattern in reference to said second axis, comprising a reference shaft, means to stabilize said reference shaft in a vertical axis, a member supported for rotation about and with respect to said reference shaft, means to position said member according to said prescribed pattern, a second shaft supported to rotate about said second axis, fork terminations for said second shaft and said member, and a pivoted universal joint connection journaled in the ends of said forks to couple said member to said second shaft, said resultant pattern of motion being derived from the motion of said second shaft and said pivoted universal joint connection.

15. In apparatus for the direction of a radio-echo direction antenna in a scanning search pattern from the deck of mobile or floating craft, a director for correcting said scanning pattern for the motion of said craft comprising, a rotatable shaft, a stabilizing mechanism, means responsive to said mechanism for supporting said shaft in a stabilized, vertical axis, an aiming member supported for rotation about and with respect to said shaft, means to position said member in accordance with said scanning pattern referred to said vertical axis, a second shaft supported to rotate about an axis having a fixed relation to said craft, a first fork mounted on end of said aiming member, a second fork mounted on said second shaft, a universal joint cross member pivotally journaled in the arms of said first fork and the arms of said second fork, and means responsive to the motion of said second shaft and said pivoted universal joint cross member to drive said antenna to follow said scanning pattern substantially independently of the motion of said craft.

WALKLEY B. EWING.

(References on following page)

REFERENCES CITED

The following references are of record in the file of this patent:

UNITED STATES PATENTS

| Number | Name | Date |
|---|---|---|
| 2,069,417 | Murtagh et al. | Feb. 2, 1937 |
| 2,409,914 | Valentine et al. | Oct. 22, 1946 |
| 2,433,837 | Dawson | Jan. 6, 1948 |
| 2,433,843 | Hammond et al. | Jan. 6, 1948 |
| 2,437,251 | Frische et al. | Mar. 9, 1948 |

FOREIGN PATENTS

| Number | Country | Date |
|---|---|---|
| 40,239 | Sweden | Feb. 23, 1916 |
| 349,149 | England | May 28, 1931 |